May 19, 1936.   R. K. LEE   2,041,556

VIBRATION DAMPENER

Filed Aug. 22, 1929

INVENTOR
ROGER K. LEE.
BY
ATTORNEY

Patented May 19, 1936

2,041,556

UNITED STATES PATENT OFFICE 2,041,556

VIBRATION DAMPENER

Roger K. Lee, Detroit, Mich., assignor to Chrysler Corporation, Detroit, Mich., a corporation of Delaware Application August 22, 1929, Serial No. 387,653

18 Claims. (Cl. 74—574)

This invention relates to torsional vibration dampers for crank shafts of internal combustion motors.

The main objects of this invention are to provide an improved torsional vibration damper in which the friction between the hub member and the inertia ring will vary with the amplitude of the vibration and to provide a vibration damper in which the inertia ring is connected to the hub or driving member by means of rubber bonded by vulcanizing to two complementary waved parts so that relative rotation therebetween will tend to cause axial movement.

An illustrative embodiment of this invention is shown in the accompanying drawing, in which.

Figure 1:
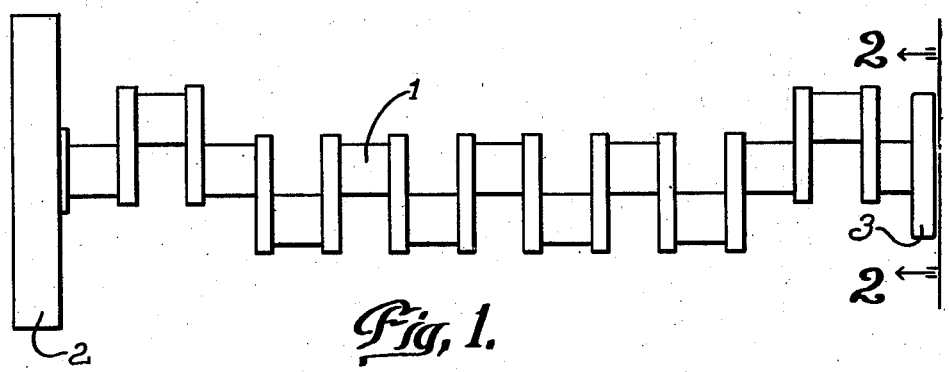
Fig. 1 is a view in elevation of a multi-throw crank shaft provided with my improved vibration damper.
Figure 3:
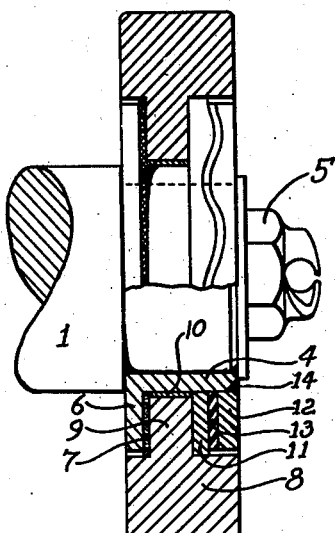
Fig. 3 is a sectional view taken partially on the line 3—3 of Fig. 2 looking in a direction indicated by the arrows, portions of the structure being shown in elevation.
Figure 2:
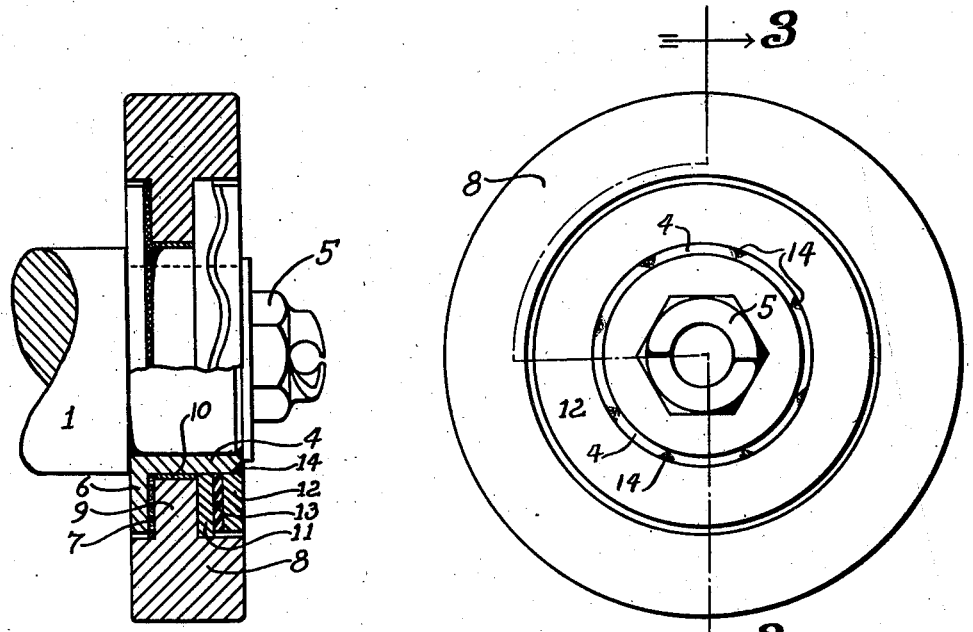
Fig. 2 is an enlarged front end view of the damper looking in a direction indicated by the arrows of the line 2—2 of Fig. 1.

Heretofore, in the construction of vibration dampers which utilize friction for the damping means, numerous means have been utilized for varying the amount of friction. These arrangements have been such, however, that the amount of friction has been directly proportionate to the speed of crank shaft rotation and have been controlled by centrifugal force.

In the present invention, however, centrifugal force does not in any way increase or decrease the amount of friction of the damping means, but the amount of such friction is directly proportionate to the amplitude of the vibration present regardless of the speed of rotation.

This is a substantial improvement in view of the fact that sometimes the amplitude of vibration is high when the speed of rotation is low, and on the other hand, the amplitude of vibration may be low when the speed of rotation is high. As the ultimate result is to dampen the vibration to a point where it will not be objectionable in the operation of the internal combustion motor, it is readily apparent that this can be best accomplished by having the damping means controlled directly by the amplitude of the vibration which is to be overcome.

In the construction shown in the drawing, a multi-throw crank shaft 1 is shown provided at one end thereof, with a fly wheel 2 rigidly keyed thereto and at the other end thereof with a vibration damper generally indicated at 3.

The vibration damper 3 comprises a hub member 4 which is keyed to the reduced front end of the crank shaft 1 and is secured thereon by a combined nut and starting crank clutch jaw 5 which is threaded in the end of the crank shaft 1. The hub 4, at its inner end, is provided with a radially extending flange 6, integrally formed thereon, against the inner face of which bears a relatively thin ring of yielding friction material 7, such as woven brake lining fabric or fibre.

An inertia ring 8, which has an inwardly extending annular flange 9, is journaled on the hub 4 with one face of the flange 9 bearing against the friction material 7. A thin sleeve of bearing material 10 is interposed between the inner periphery of the flange 9 and the outer periphery of the hub 4.

The face of the flange 9, opposite to the face which bears against the friction material 7, has a metal ring 11 welded, or otherwise suitably secured thereto, the outer face of which is waved to provide a plurality of cam surfaces. The waved outer face of the ring 11 is bonded to a complementary waved ring 12 in spaced interfitting relation, by a thin layer of rubber 13 which is vulcanized to the adjacent faces of the waved complementary rings, so as to provide a yielding resilient connection which will permit limited relative rotation therebetween. The outer waved ring 12 is welded at spaced intervals 14, or otherwise suitably secured to the front end of the hub member 4 so as to hold the various parts in assembled relation. The flange 6 and ring 12 thus provide a pair of axially spaced, radially extending flanges which embrace opposite sides of the inertia member. The arrangement and proportion of the parts are such that when the device is assembled, the rubber 13 is preferably under compression so as to secure a frictional engagement on opposite sides of the ring 7.

In the operation of this vibration damper, torsional vibration of the crank shaft causes relative rotation between the hub 4 and the inertia ring 8 which tends to rotate at a uniform rate. This relative movement between the hub and inertia ring is permitted by the rubber bond between the adjacent faces of the waved rings 11 and 12.

Due to the interfitting complementary waved faces of the two rings, relative rotation between them in either direction will cause the rubber to be additionally compressed thereby camming the flange 9 of the inertia ring 8 axially into tighter engagement with the ring of friction material 7.

The amount of this increased frictional engagement is directly proportionate to the amount of relative rotation between the inertia ring and the hub. As this amount of relative rotational movement is determined by the amplitude of the torsional vibration, the amplitude of vibration thereby directly controls the amount of frictional engagement between the hub and ring which functions to dampen the vibrations of the crank shaft.

The functioning of this damper is to be clearly distinguished from that of vibration dampers heretofore used, in that when there is relative movement between the inertia ring and its driving hub and the inertia ring reaches its limit of movement, then at that time the moment of inertia of the inertia ring is added to the moment of inertia of the crank shaft. It then becomes apparent that we have to deal with a varying moment of inertia and of course, it is impossible for any mechanism which has a varying moment of inertia to oscillate in a harmonic movement.

Although but one specific embodiment of this invention has been herein shown and described, it will be understood that numerous details of the construction shown may be altered or omitted without departing from the spirit of this invention as defined by the following claims.

I claim:

1. A vibration damper comprising a driving member, an inertia member driven by said driving member, friction means functioning between said members for damping vibration, and a driving connection for maintaining said members in engagement with said friction means including a resilient element and means acting upon said resilient element actuated by and in proportion to the amplitude of vibration varying the damping function of said friction means.

2. A vibration damper comprising a driving member and inertia member driven by said driving member, friction means functioning between said members for damping vibration, and a driving connection for maintaining said members in engagement with said friction means including a resilient element and means actuated by relative rotational movement between said members for varying the compression of said resilient element and the damping function of said friction means.

3. A vibration damper comprising a driving member, an inertia member driven by said driving member, friction means functioning between said members for damping vibration, and a driving connection for maintaining said members in engagement with said driving means including a resilient element and a pair of rigid elements on the opposite sides thereof, one fixed to each of said members respectively and each having means thereon for varying the compression of said resilient means and the damping function of said friction means in proportion to the amount of relative rotational movement of said members.

4. A vibration damper comprising a member adapted to be secured to a multi-throw crank shaft, an inertia member, overlapping surfaces on said members, friction material interposed between said ovelapping surfaces, and resilient means providing a yielding driving connection between said members and maintaining said surfaces in frictional engagement with said friction material including means responsive to relative rotation of said members for increasing said frictional engagement in proportion to the amplitude of torsional vibration in the crank shaft to which said damper is secured.

5. A vibration damper comprising a member adapted to be secured to a multi-throw crank shaft, an inertia member, overlapping surfaces on said members, friction material interposed between said overlapping surfaces, and resilient means fixed to both of said members for maintaining said surfaces in frictional engagement with said friction material and yieldably driving one by the other including means responsive to relative movement of said members for camming said members relatively to each other to vary the amount of said frictional engagement.

6. A vibration damper comprising a member adapted to be secured to a multi-throw crank shaft, an inertia member, radially extending overlapping surfaces on said members, friction material interposed between said overlapping surfaces, and means for maintaining said surfaces in frictional engagement with said friction material including means responsive to relative movement of said members for moving one of said members axially with respect to the other of said members for varying the amount of said frictional engagement.

7. A vibration damper comprising a member adapted to be secured to a multi-throw crank shaft, an inertia member, overlapping surfaces on said members, friction material interposed between said overlapping surfaces, a driving connection between said members including yielding means for permitting relative movement between said members and for maintaining said surfaces in frictional engagement with said friction material and means responsive to relative rotation of said members for increasing said frictional engagement in proportion to the amplitude of torsional vibration in the crank shaft to which said damper is secured.

8. A vibration damper comprising a hub member adapted to be secured to a multi-throw crankshaft, an inertia member, and means coacting frictionally with said members and yielding means connecting and permitting limited relative rotation between said members including means operative upon said connecting means for increasing such frictional engagement in proportion to the amount of relative rotation between said members.

9. A vibration damper including a hub member adapted to be secured to a multi-throw crankshaft and an inertia member, engaged faces on said hub and inertia members, overlapping cam surfaces on said members for moving one of said members axially with respect to the other of said members in such a manner as to urge said faces together during relative rotation of said members so as to frictionally oppose relative rotation thereof, and yielding means interposed between said cam surfaces.

10. A vibration damper including a hub member adapted to be secured to a multi-throw crankshaft and an inertia member, engaged faces on said hub and inertia members, overlapping cam surfaces on said members for moving one of said members axially with respect to the other of said members in such a manner as to urge said faces together during relative rotation of said members so as to frictionally oppose relative rotation thereof, and yielding means interposed between said cam surfaces, such frictional opposition being varied by said cam surfaces upon relative rotation of said members in proportion to the amount of such relative rotation.

11. A vibration damper comprising a hub member adapted to be secured to a multi-throw crankshaft, a pair of radially extending axially spaced flanges on said hub member, an inertia member embraced by said flanges, engaged faces on said inertia member and one of said flanges respectively for frictionally restraining rotation of said inertia member relative to said hub member, and means acting between said inertia member and the other of said flanges for varying the degree of such frictional restraint upon relative rotation of said members.

12. A vibration damper comprising a hub member adapted to be secured to a multi-throw crankshaft, a pair of radially extending axially spaced flanges on said hub member, an inertia member embraced by said flanges, engaged faces on said inertia member and one of said flanges respectively for frictionally restraining rotation of said inertia member relative to said hub member, complementary interfitting cam surfaces on said inertia member and the other of said flanges respectively, and yielding means interposed between said cam surfaces.

13. A vibration damper comprising a hub member adapted to be secured to a multi-throw crank shaft, a pair of axially spaced, radially extending flanges on said hub member, an inertia member journaled on said hub member between said flanges, friction material interposed between one side of said inertia member and the adjacent flange, interfitting complementary cam surfaces on the other side of said inertia member and the other of said flanges respectively and yielding means interposed between said cam surfaces.

14. A vibration damper comprising a hub member adapted to be secured to a multi-throw crank shaft, a pair of axially spaced, radially extending flanges on said hub member, an inertia member journaled on said hub member between said flanges, yielding friction material interposed between one side of said inertia member and the adjacent flange, the opposite side of said inertia member being waved to provide cam surfaces, the adjacent side of said other flange being provided with a complementary interfitting waved surface and rubber bonded by vulcanization to said complementary surfaces.

15. A vibration damper comprising a driving member, an inertia member journaled on said driving member, friction means functioning between said members for damping vibration, and means fixed on said driving and inertia members respectively having a rubber connecting element for yieldably driving said inertia member from said driving member and actuated by and in proportion to the amplitude of vibration for varying the damping function of said friction means.

16. A vibration damper comprising a driving member, an inertia member rotatable relative to said driving member, engaged faces on said driving member and said inertia member respectively, and a driving connection for transmitting rotational movement from said driving member to said inertia member and for maintaining said faces in frictional engagement with each other having a resilient element under compression and including means responsive to relative rotation of said members for varying the pressure on said element and the pressure with which said faces engage each other.

17. A vibration damper comprising a driving member, an inertia member journaled thereon, said inertia member being shiftable axially of said driving member, and means for yieldably holding said inertia member against rotational and axial movements relative to said driving member including a yieldable element and means acting upon said yieldable element responsive to relative movement between said members for urging said inertia member axially of said driven member.

18. A vibration damper comprising a hub member adapted to be secured to a multi-throw crankshaft, an inertia member, engaged faces on said inertia member and hub member for frictionally restraining relative rotation thereof, and means for securing said members together including a yielding element for permitting limited relative rotation therebetween and including means responsive to relative movements of said members for increasing such frictional restraint.

ROGER K. LEE.